INVENTOR.
WILLIAM E. NEMETH
BY Alden D. Redfield
Charles M. Hogan
ATTORNEYS.

Sept. 26, 1967 W. E. NEMETH 3,344,400

PLURAL FREQUENCY RESPONSIVE RECEIVER

Filed March 26, 1964 4 Sheets-Sheet 2

INVENTOR.
WILLIAM E. NEMETH
BY Alden D. Redfield
Charles M. Hogan
ATTORNEYS.

PLURAL FREQUENCY RESPONSIVE RECEIVER

Filed March 26, 1964

4 Sheets-Sheet 3

INVENTOR.
WILLIAM E. NEMETH
BY Alden D. Redfield
Charles M. Hogan
ATTORNEYS.

NOISE IMMUNE FILTER D.C. OUTPUT VS FREQ. CHARACTERISTIC

NOISE IMMUNE FILTER INPUT IMPEDANCE VS FREQ. CHARACTERISTIC

INVENTOR.
WILLIAM E. NEMETH
BY Alden D. Redfield
Charles M. Hogan
ATTORNEYS.

United States Patent Office 3,344,400

Patented Sept. 26, 1967

3,344,400

PLURAL FREQUENCY RESPONSIVE RECEIVER

William E. Nemeth, Cincinnati, Ohio, assignor to Avco Corporation, Cincinnati, Ohio, a corporation of Delaware Filed Mar. 26, 1964, Ser. No. 355,052
9 Claims. (Cl. 340—171)

ABSTRACT OF THE DISCLOSURE

This is a decoding device which responds to wave transmissions, comprising address and command tones supplied in a sequence, by performing switching functions in compliance with the command tones. A plurality of band-pass filter-detectors is provided for the selection of tones and each of these detectors is coupled to a memory device of the type actuated by a positive bias and biased off by a negative bias. An additional band-pass filter-detector is provided for the selection of the address tone and this detector, in combination with a switching means, sets up or enables all of the memory devices in response to an address tone. The invention features, in combination with the band-pass filter-detectors, a single aperiodic detector which has an output differentially combined with each of the outputs of the filter-detectors in such a manner that noise detected by the aperiodic detector biases off the switching means and all of the memory devices except those selecting tones. The memory devices are suitably coupled to a matrix of "and" circuits so that output indications furnished by the system comply with any arbitrarily selected tone sequence.

The present invention relates to command decoders of the type which must meet rigorous requirements as to reliability, lightness of weight, compactness, ruggedness, low power demand, immunity to jamming and spurious interrogations, and survival in extremely hostile environments.

A primary object of the invention is to provide a decoder having novel circuitry directed to meeting these requirements. One of such primary objects is to provide a filter system, of utility in decoders and elsewhere, which selects received tones with a high degree of noise immunity.

A related object is to provide a multi-channel filter system which produces no usuable output in the presence of white broad-band noise alone.

Another object of the invention is to provide a multi-channel filter circuit having an automatic squelch action, in that, below a minimum signal-to-noise ratio, the filters are not operating at all.

Another main object of the invention is to provide a solid state address circuit which senses the presence of an address tone, enables the remaining decoder circuits, and maintains them in an enabled condition for a sufficient period of time after disappearance of the address tone to allow reception of the command tones.

A related object is to provide a solid state address circuit which returns all memory switches to their stand-by condition upon receipt of the address tone.

It is also an object of the invention to provide fast attack, slow release electronic relay means which functions in such a manner that high load power is controlled from a low power signal source and by a low power switching means.

Another principal object of the invention is to provide an improved bistable memory circuit of general utility in data processing and control equipment.

For a better understanding of the present invention, together with other and further objects, advantages, and capabilities thereof, reference is made to the following description of the accompanying drawings, in which.

Figure 1:
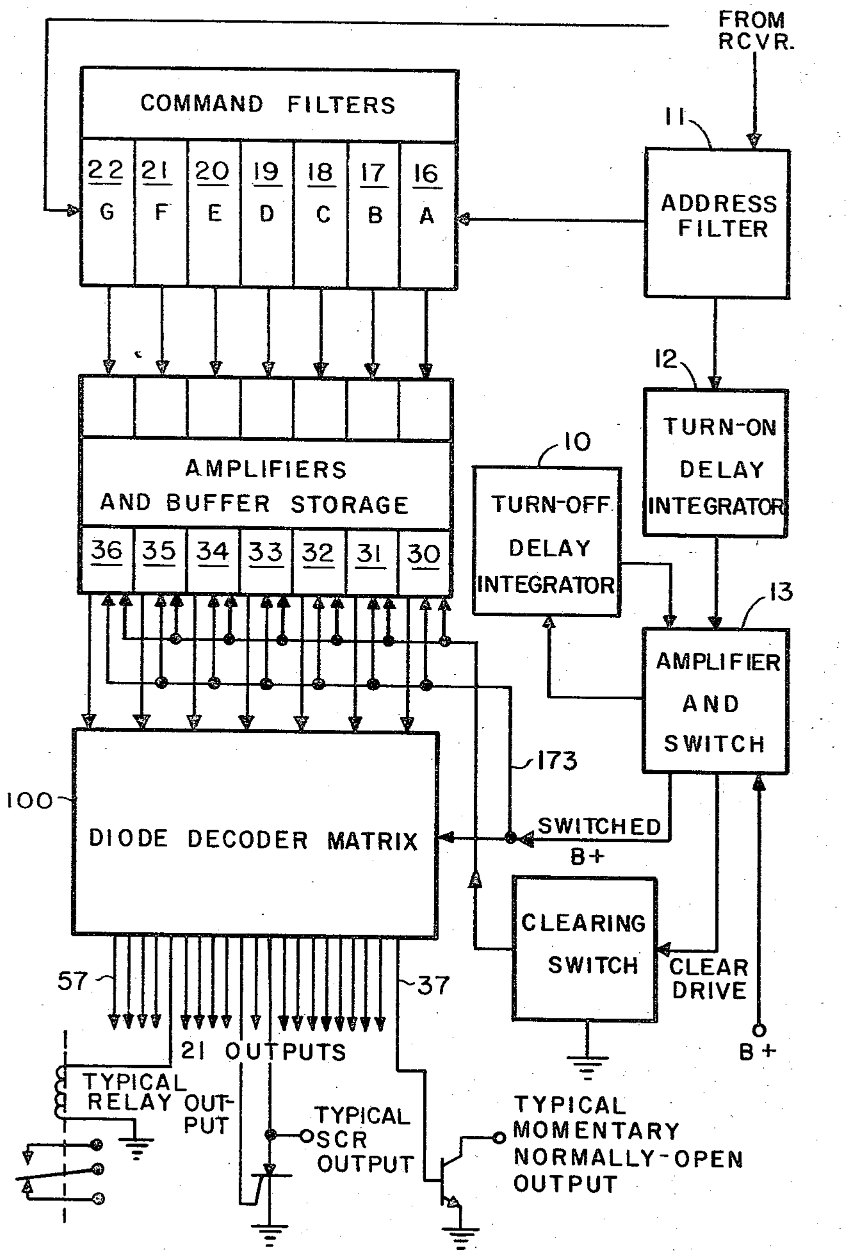
FIG. 1 is a block diagram of a complete command decoder in accordance with the invention, inclusive of an address system and seven command filter channels.

Referring now to the over-all operation of a decoder in accordance with the invention, there are available to be supplied to the decoder eight tone frequencies, one of which is an address tone and the remaining seven of which are the command tones. The address tone selects the associated receiver and decoder, and the decoder responds to any two command tones. From the mathematical principle of combinations of X things taken Y at a time, in this case seven tones taken two at a time, it will be understood that a seven-command tone decoder which accepts two command tones at a time is capable of producing twenty-one separate output commands. That is to say, the decoder accepts a three-tone input sequence and produces one output command for each sequence. The first tone is the decoder address. As indicated above, the address tone is utilized to select one of a plurality of decoders whose receivers are tuned to the same carrier frequency. The discussion will now assume that the decoder here described has been selected.

The decoder operates when the sequence of three input tones of the proper frequency and spacing is delivered by the receiver to the decoder. The first tone is the address tone. This is recognized by an address filter device 11 (FIGS. 1 and 3), which triggers an address switch (included in block 13, FIG. 1). The address filter incorporates a delay integrating network which is symbolically illustrated in FIG. 1 by a separate block 12. The address switch in unit 13 closes a circuit between a power source and a line 14 (FIG. 2), which line supplies power to all the remaining decoder circuits. The unit 13 further causes this circuit to remain in closed condition for a sufficient period of time after removal of the address tone to allow receipt of the two command tones. For this purpose the switch is associated with a delay integrator network symbolically illustrated by block 10.

The command tones are recognized by their respective filters, and accordingly seven distinct command filters are provided. These are lettered A, B, C, D, E, F, G (FIG. 1) to indicate the discrete tones A, B, C, D, E, F, G, and they are numbered from 16 to 22, inclusive, to illustrate discrete structures.

The input tones being sequential, memory circuits are incorporated in the decoder logic. The command tones from the filters 16–22 are amplified and stored by the respective command memory switches 30–36 (FIG. 1).

The decoder in accordance with the invention operates in such a manner that, when any two of the memory elements 30–36 have been activated, the appropriate one of the twenty-one output circuits becomes energized.

The output circuits are numbered 37–57, inclusive (FIGS. 1 and 2), and these are the output lines of a decoder matrix 100 which is shown in detail in FIG. 2 and comprises seven groups of diodes numbered as follows:

| | |
|---|---|
| First group (at output of storage element 30) | 58–63 |
| Second group (at output of storage element 31) | 64–69 |
| Third group (at output of storage element 32) | 70–75 |
| Fourth group (at output of storage element 33) | 76–81 |
| Fifth group (at output of storage element 34) | 82–87 |
| Sixth group (at output of storage element 35) | 88–93 |
| Seventh group (at output of storage element 36) | 94–99 |

The reference numeral 100 is applied to the diode decoder matrix as a whole.

It has been stated that when any two of the memory elements 30–36 have been operated, one of the twenty-one output circuits becomes energized. To illustrate this point, let it be assumed that filter 22 has been energized by the reception of tone G, and that filter 20 has also been energized. In that event output circuit 57 is activated, that output line representing the command given by the combination of tones G, E.

The address tone operates the address switch, which in turn energizes the command memory switches 30–36. The address switch (in 13, FIG. 1) remains closed long enough after removal of the address tone for the decoder to accept both command tones, thus producing an output. Shortly thereafter, the address switch returns to the standby state, removing power from all command memory switches and from all outputs.

If one command sequence immediately follows another, the address switch will not drop out. Instead, the reappearance of the address tone operates a clearing circuit (173, FIG. 3) which returns all momentary outputs to "off," in preparation for the next command sequence.

*The filter*

Figure 3:
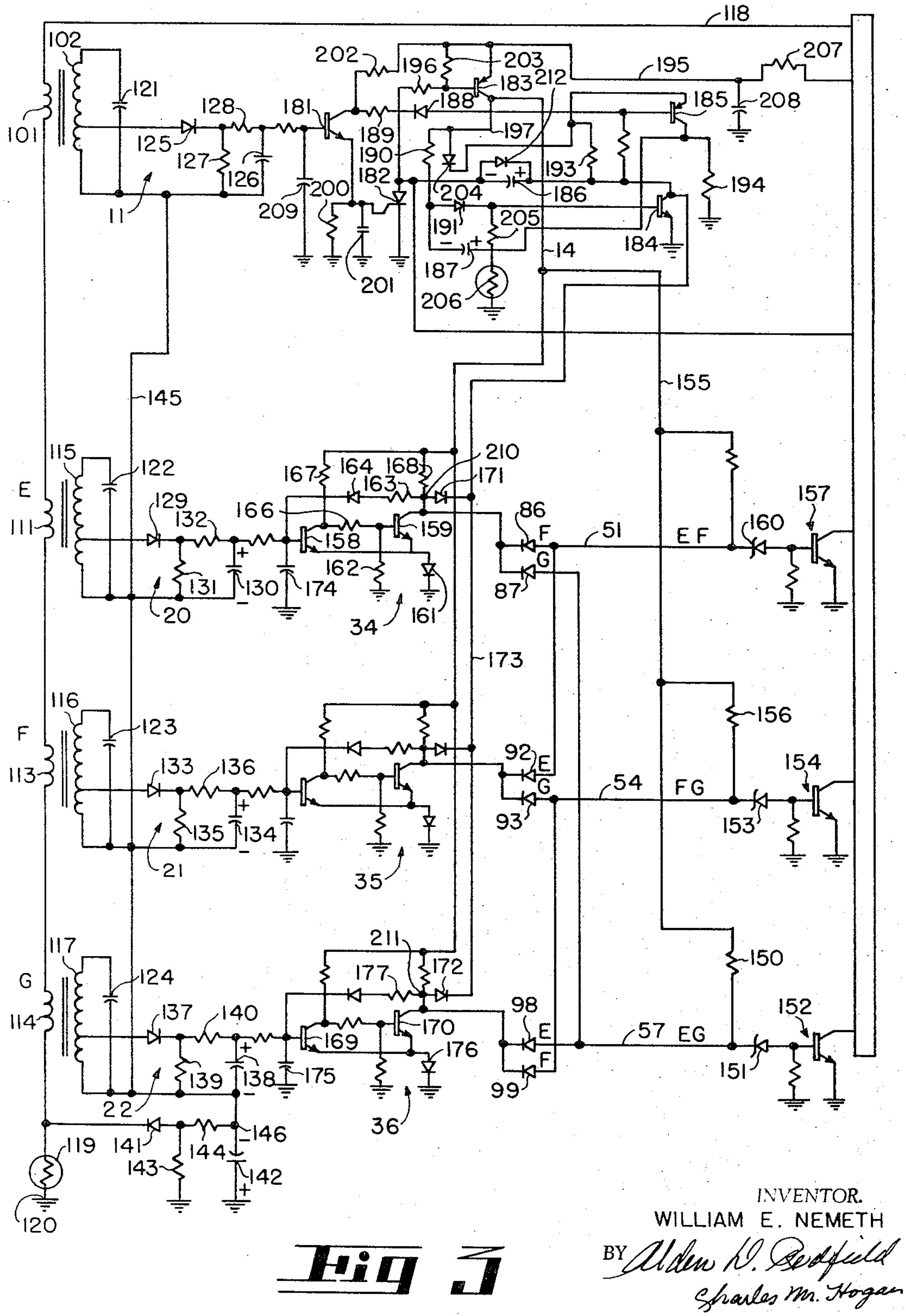
FIG. 3 is a circuit schematic of the FIG. 1 decoder, four of the command filter channels being omitted for purposes of clarity and simplification of exposition.

Referring now specifically to FIG. 3, there are shown the details of the address filter network and the tone filter networks (such as 20, 21, and 22) in accordance with the invention. The tone filter networks 16, 17, 18, and 19 are omitted from this figure for purposes of clarity in exposition, they being similar in construction and function to the tone filters 20–22 but optimized for different portions of the frequency spectrum.

The input to the address filter 11 comprises a transformer having a primary 101 and a secondary 102. The inputs to the filters 20, 21, and 22 respectively comprise transformers having primaries 111, 113, and 114, and secondaries 115, 116, and 117, respectively. The primaries 101, 111, 113, and 114 are arranged in a common circuit in series with the input line 118 from the receiver (not shown) and with a resistor 119, one lead of which is connected to a grounded point of reference potential 120. The tone currents from the receiver flow through all of the filter primaries in series and finally through resistor 119 to ground, the receiver acting as a constant current source.

The address filter 11 (FIG. 3) comprises a resonant or tank circuit consisting of secondary 102 and a shunt capacitor 121, tuned to the address tone. Similarly, the filters for the tones E, F, and G have their transformer secondaries in shunt with capacitors 122, 123, and 124, whereby they are severally tuned to the respective tones.

The secondary of the address filter transformer is tapped for low impedance driving into a peak detector comprising diode 125 and its detector load network, which comprises shunt capacitor 126, shunt resistor 127, and series resistor 128. The E, F, and G filters similarly drive into detector networks consisting of these elements: 129–132, for filter 20; 133–136, for filter 21; 137–140, for filter 22.

The current flowing in resistor 119 (FIG. 3) drives a diode 141, which peak rectifies into a load comprising capacitor 142 and resistors 143 and 144. Attention is invited to the fact that rectifier 141 is so poled that the charge across capacitor 142 is opposed in polarity to the charges across capacitors 138 and 134, 130 and 126—i.e., the output capacitors of the several tone filter networks and the address filter network. Attention is further particularly invited to a conductor 145, which connects the low potential terminals of capacitors 126, 130, 134, and 138 to the ungrounded negative terminal 146 of capacitor 142, whereby all filter outputs are referenced to the negative side of capacitor 142.

Figure 5:
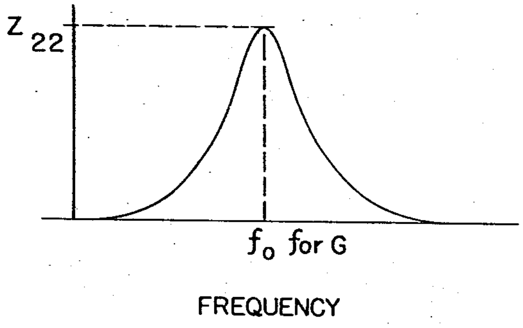
FIG. 5 is a typical input impedance versus frequency characteristic curve representative in principle of any one of the filter channels.

When a command tone is of the proper frequency, the corresponding one of the filters such as 20, 21, and 22 presents a high impedance. This impedance, for example $Z_{22}$ (FIG. 5), is high compared to that of the unexcited filters and that of resistor 119. When an input tone G is received, filter 22 produces an output which is peak-detected by the combination of diode 137, resistors 139 and 140, and capacitor 138, producing a direct current voltage across capacitor 138 of the polarity indicated. At the same time tone filter 20 has practically no output voltage, since its impedance for tone G is low. The other tone filters 16–19 and 21 also have no output voltages. The aperiodic network coupled to resistor 119, specifically the rectifier 141, resistors 143 and 144, and capacitor 142, likewise peak-detects the input frequency, producing a voltage across capacitor 142 of polarity opposite to that across capacitor 138. Remembering that the impedance of resistor 119 is low compared to $Z_{22}$, the voltage across capacitor 138 is substantially larger than that across capacitor 142, so that a positive voltage appears at the output of filter 22, for application to command memory switch 36.

Attention is again invited to the fact that all filter outputs are referenced to the negative side of capacitor 142. Due to this factor, at the same time that tone filter 22 is producing a positive output, the unexcited tone filters will have a negative or cut-off output corresponding to the drop across capacitor 142.

Figure 4:
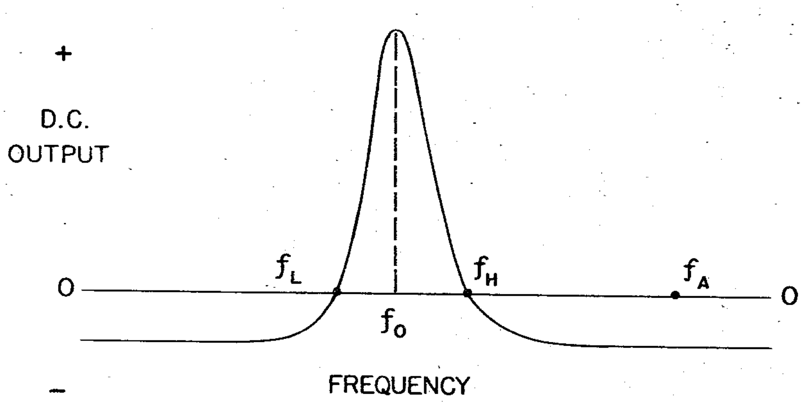
FIG. 4 is a direct current output voltage versus frequency characteristic curve illustrating the performance of the noise immune filter in accordance with the present invention.

By similar reasoning, if the input tone corresponds to that of any tone filter, such as 20, that filter will have a positive output and the unexcited filters will have a negative output. Thus it will be seen that, for every input tone, the corresponding filter produces a positive output whereas all the other filters produce negative outputs. This condition is summarized in FIG. 4, which shows the output magnitude and polarity versus frequency for any given filter.

Now, suppose that white broad-band noise alone were present at the input. This would be the case, for example, if the receiver were not sensing a carrier. The impedance of any given filter to this broad-band noise will be lower than its on-center impedance by the ratio of the filter bandwidth to the noise spectrum. This impedance is made to be small compared to that of resistor 119. As a result, the positive voltage from each filter will be small compared to the negative voltage on capacitor 142. This is further enhanced by the fact that the ratio of peak voltage to root-mean-square (RMS) voltage for noise is about 3:1, as compared to the same ratio for sinusoidal signals, which is, of course, 2. Thus, for a given RMS noise across resistor 119, the voltage across capacitor 142 is much greater than it would be if the same RMS voltage were developed across resistor 119 by tone signal.

The net result of all this is that, in the presence of white broad-band noise, all the filter outputs will be negative, and as a result no usable output can occur. Furthermore, the circuit has an automatic squelch action, in that, if a noise signal is present, the filter outputs will diminish until, at some minimum signal-to-noise ratio, the filters will not be operative.

The voltage on the capacitor 138 (for example) is added algebraically to the voltage developed across capacitor 142 by the wide-band transformerless detector composed of capacitor 142 and resistors 119, 143, and 144 and diode 141. The voltage across capacitor 142 is always negative and is essentially independent of input frequency. Since the total area of the negative portion of the response (FIG. 4) is much greater than that of the positive portion, the output of the entire filter system goes negative if the input is a low level of wide-band noise. The output goes more negative as the energy per root cycle of the input is increased. Furthermore, this new filter system has the characteristic that when any channel is being operated, all other channels will be back-biased by equal amounts regardless of their frequency separation from the operated channel.

It is reiterated that, when the receiver delivers an autio tone of the proper frequency, the corresponding filter responds with a positive D.C. output voltage which drives the command memory switch indicated. At the same time all other filters actually deliver negative D.C. (cut-off) voltage to their loads. Thus, if two or more sinusoids of improper frequency are presently simultaneously (indicating improper or unwanted interrogation), the filters are desensitized, and, for normal tone input levels, will not operate the loads indicated.

It is reiterated that the same type of action results if white broad-band noise is introduced rather than an audio signal. This would happen, for example, whenever the receiver is not getting an RF carrier signal. In this case all filters deliver negative D.C. (cut-off) outputs. The net results is that, in the presence of white broad-band noise, no drive is available for the loads indicated, regardless of the strength of this noise.

The decoder is highly immune to broad-band noise, due to the tone filter construction. It is also immune to all interrogation except during the very brief periods that the address switch is energized by the address tone. The block 12 in FIG. 1 indicates the performance of a turn-on delay function. A delay network is accordingly incorporated in the address channel between primary 101 and the switch transistor 183 which couples line 14 to the power supply (FIG. 3). The built-in delay parameters in the address channel perform a heavy turn-on integration of the address tone. All of these characteristics combine to safeguard the decoder against the danger of accidental interrogation by any kind of spurious input.

*The decoder matrix*

Figure 2:
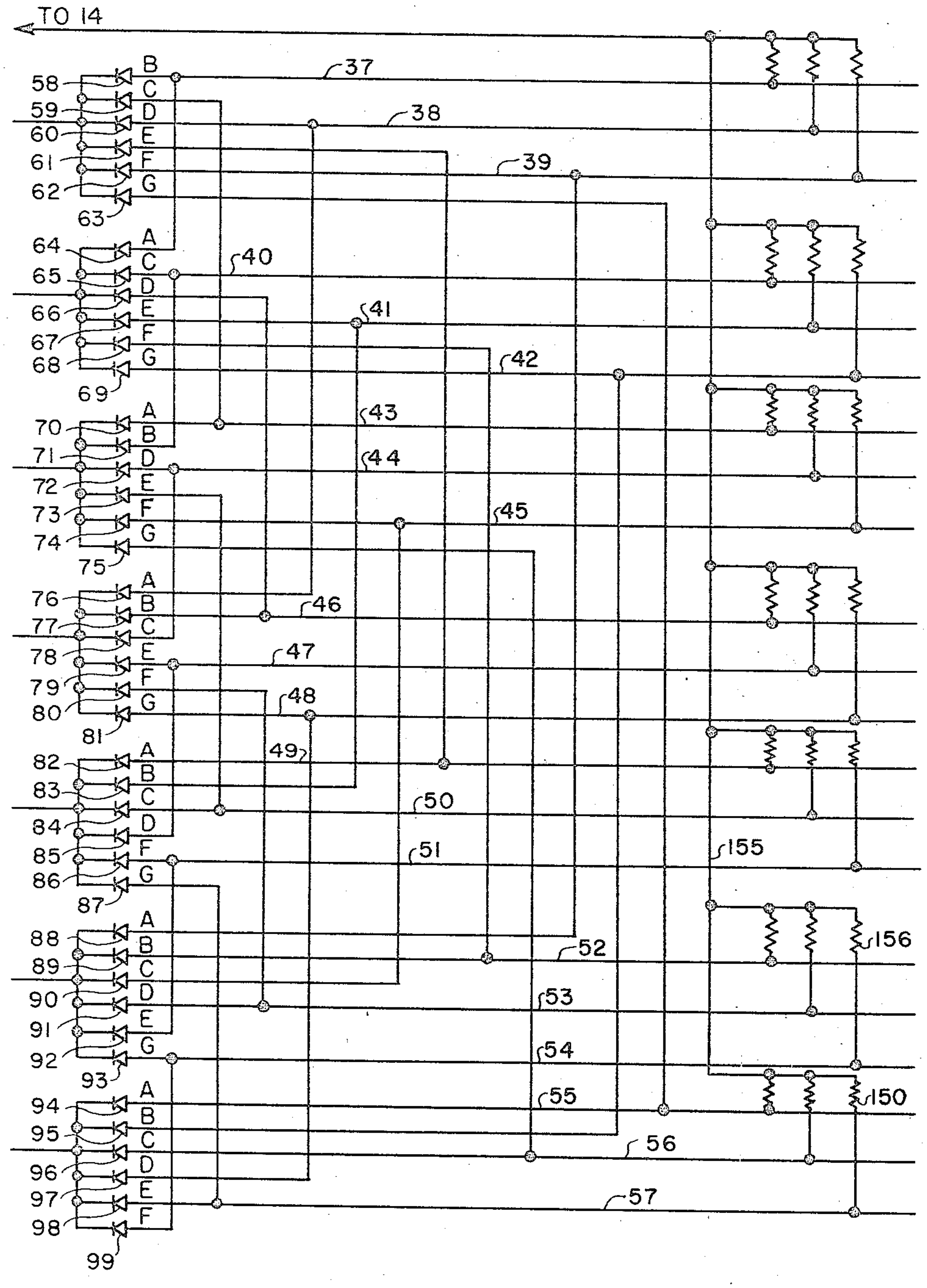
FIG. 2 is a circuit diagram of the diode matrix device in the FIG. 1 decoder.

The decoder matrix is indicated at 100 in FIG. 1 and is shown in detail in FIG. 2. Only such parts of the decoder matrix are shown in FIG. 3 as pertain to the tone combinations EF, FG, and EG, and to the three output lines 51, 54, and 57.

In the particular embodiment shown, there are twenty-one output lines, numbered 37–57 (FIG. 2). Each line is capable of being activated by one of the following pairs of tones: AB, AC, AD, AE, AF, AG, BC, BD, BE, BF, BG, CD, CE, CF, CG, DE, DF, DG, EF, EG, FG.

Since each output line can be activated by the presence of two tones, each output line is connected to an "and" circuit comprising two diodes. For example, the "and" circuit which is connected to output line 57 (which can be activated by the tones E and G) comprises diodes 87 and 98, the anodes of which are connected together and to line 57. These anodes are connected through a load resistor 150 to the positive supply voltage line 14. The cathode of diode 87 is connected to the output of memory element 34, and the cathode of diode 98 is connected to the memory element 36. Operation of the "and" circuit comprising diodes 87 and 98 is such that, when both cathodes are made positive by cut-off of transistors 159 and 170 (FIG. 3), neither diode conducts and current flow through resistor 150 cannot pass through line 57 and the "and" circuit 87, 98. However, this current breaks down zener diode 151 (FIG. 3), which is connected in series between the output line 57 and transistor 152 of an output switch. The over-all operation is such that, when command memory devices 34 and 36 are activated by the presence of tones E and G, the "and" circuit 87, 98 becomes non-conductive and the EG output switch 152 is activated.

Similarly, in the presence of the tones F and G, the memory devices 35 and 36 are activated, the "and" circuit comprising diodes 93 and 99 becomes non-conductive, and zener diode 153 in series with output line 54 is broken down, activating output switch 154. The "and" circuit comprising diodes 93 and 99 is so arranged that the anodes are connected together and to branch 155 of the positive supply line 14 via resistor 156. In like manner, the presence of the tones E and F activates memory devices 34 and 35, and the circuit comprising diodes 86 and 92 becomes non-conductive so that output switch 157 is activated.

Generalizing, each of the twenty-one output lines is connected to an "and" circuit comprising two diodes. There are therefore forty-two diodes in the diode matrix. Each command memory switch can signify the presence of a command tone which can be followed by any one of the six other tones. Therefore individual groups of six diodes each are connected to the outputs of the command memory switches.

*Command memory switches*

There are a total of seven command memory switches (30–36, FIG. 1), one for each command filter. The purpose of these switches is two-fold: first, to sense the presence of a given command tone, and, second, to store this information until the second command tone has been received, allowing the two-at-a-time output logic to operate.

In FIG. 3 there are shown in detail the circuits of three of the command memory switches. Each is basically a Schmitt trigger. Let switch 34 be discussed. In stand-by, with power supplied, transistor 158 is cut off and transistor 159 is saturated, the base of transistor 159 being appropriately biased from the voltage divider comprising resistors 162, 166, and 167 (progressing from ground to +B). Introduction of a positive pulse of direct voltage from filter 20 to transistor 158 causes transistor 158 to saturate. The pulse first increases the current in diode 161. That increases the interstage coupling between transistors 158 and 159, reduces the forward base-emitter bias on transistor 159, aiding the lowered base bias on transistor 159 due to the increased voltage drop across resistor 167, and initiates the action to turn on transistor 158 and turn off transistor 159. That action, once initiated, is regenerative and proceeds to completion in a low order of nanoseconds in the typical circuit. As the collector voltage of transistor 158 falls to a low value, the base of transistor 159 also falls, driving transistor 159 into cut-off. The rising collector voltage of transistor 159 reaches the zener breakdown threshold of diode 160. When the zener diode breaks down, a step-function current is driven through the base of output switching transistor 157. Fall time and rise time of the transistor 157 collector voltage are each in the neighborhood of one microsecond. Because the output switch has a low saturation voltage and fast rise and fall times, the load line can safely exceed the maximum rated dissipation during the switching transient.

Diode 161 has the further function of regulating the threshold potential required of the set and reset signals against variations in the magnitude of the bias supply.

A feedback path comprising resistor 163 and diode 164 is connected from the collector of transistor 159 to the base of transistor 158. The command memory switch 34 is therefore a latching device, necessitating clearing or turn-off circuitry.

The circuitry "latches" in either state, so narrow initial pulses are sufficient to set or reset. The circuitry retains the memory so long as the power supply is maintained. Any interruption of the bias supply automatically returns the device to the reset state. This feature provides a fail-safe reference.

Turn-on of the memory element 34 is now further considered. Starting in the cleared condition with transistor 158 cut off and transistor 159 saturated, a positive voltage is applied to the base of transistor 158. Transistor 158 is turned on. As the transistor 158 collector falls, transistor 159 becomes cut off, causing the collector of the latter to rise to a value determined by the voltage divider network 167, 166, 162. The base of transistor 158 is held positive by voltage feedback from the collector of transistor 159.

The clearing switch action is now considered. Remembering that transistor 159 is in cut-off and transistor 158 in saturation for a turned-on command memory switch 20, it is apparent that the collector of transistor 159 is pulled down from the cut-off level to a small positive voltage. This low voltage on the collector of transistor 159 is fed back to the base of transistor 158, removing the drive voltage and cutting transistor 158 off. As the collector of transistor 158 rises, the base of transistor 159 also rises, and transistor 159 goes into a true saturated condition (both junctions are forward biased). The effect is regenerative. Subsequent to the transient, the input junction of transistor 158 is actually reverse biased, with a base voltage of about 0.2 VDC and an emitter voltage of 0.7 VDC, for example; its collector voltage of about 11.5 VDC is applied to the base of transistor 159 by the divider circuit. The base voltage of transistor 159 is clamped at about 1.3 VDC by stabistor diode 161 and the input diode of 159; emitter and collector voltages are respectively 0.7 VDC and 0.8 VDC.

As already noted, threshold level stability is maintained by stabistor diode 161 and the base-emitter diode of transistor 158. Therefore the input direct voltage must overcome two diodes at turn-on threshold.

The clearing switch while closed (i.e., line 173 activated) overrides input levels above threshold, including the maximum the decoder would ever see in use.

Let us return to a consideration of reception of EG tones, for example. With no tones present, transistors 159 and 170 are both in saturation (FIG. 3), receiving drive through the resistive bias networks shown. Therefore, their collectors are at low potential (about one volt). This voltage is too low to provide drive for transistors 158 and 159 through resistors 163 and 177, respectively. When a D.C. output from the command filter for tone E is present, transistor 158 conducts and brings transistor 159 regeneratively out of conduction. Thus, the collector of transistor 159 rises to a potential determined by the voltage division between resistors 168 and 163, and feedback through resistor 163 holds transistor 158 in saturation. This rise in potential of the collector of transistor 159 will remain after command tone E has been removed, thus producing the desired memory. If a D.C. output from the command filter for tone G now appears, by similar reasoning the collector of transistor 170 is seen to rise to the same potential as transistor 159.

Diodes 87 and 98 form the two-at-a-time "and" gate to the output circuit 57, and since both diodes are now back-biased, the potential of the output line 57 will rise. Diodes 171 and 172 are isolation diodes which connect the output collectors of the command memory switches to the clearing line 173. When the clearing line 173 is grounded by the action of the address switch, the feedback paths through resistors 163 and 177 are shunted to ground, and both memory switches 34 and 36 return to the stand-by condition. These memory switches also have the automatic clearing action mentioned above, in that, if the supply voltage is interrupted even momentarily, all switches will set up in the stand-by condition. This is aided by capacitors 174 and 175, which prevent transistors 158 and 169 from conducting during the transient reapplication of voltage.

These switches will be recognized as bistable innovations of the Schmitt trigger. Diodes 161 and 176 replace the resistors commonly found in the emitter circuits of Schmitt triggers. These diodes function as feedback resistors, but in addition serve to stabilize the threshold firing voltage against changes in supply voltage. In other words, these diodes act to regulate the emitter potential.

*The address switch*

It has been mentioned that one of the purposes of this switch is to couple the decoder (specifically line 14) to the voltage supply line 195 (FIG. 3). Line 195 is connected via a conventional filter network comprising resistor 207 and capacitor 208 to the positive terminal of a suitable primary source of power (not shown). This line 195 is connected to the emitter of a PNP transistor 183, the collector of which is connected to line 14. This transistor functions as an "on-off" switching device and is closed on reception of the address tone, thereby effectively to connect together the lines 14 and 195 to supply power to the decoder. It will be understood that the power supply remains coupled to the decoder for a sufficient time after removal of the address tone to permit the command tones to be received and processed. It will be shown that the time-constant circuit comprising resistor 190 and capacitor 187 assures the required turn-off delay. The other purpose of the address switch is to clear or return all command memory switches to their stand-by mode immediately on receipt of the address tone. This is accomplished by transistor 184, the emitter of which is connected to ground. In the collector circuit of this transistor is the clearing line 173, which is connected to the cathodes of all of the clearing diodes 171, 172, etc., so that, in the manner described below, the transistor 184 applies a near-ground-potential pulse to line 173 to clear all of the command memory switches—i.e., to put them in that condition in which the transistors such as 159 and 170 are conductive.

The necessity for the turn-off delay integrating function is indicated by the block 10 in FIG. 1. The turn-off integrator 10 comprises the resistor 190 and capacitor 187 illustrated in FIG. 3. The necessity for a clearing switch function is indicated by an appropriately labelled block in FIG. 1. The clearing function is performed by the transistor 184 in FIG. 3, which may be understood to be included within the block 101.

Now referring to the block 13 in FIG. 1, it comprises the following elements shown in FIG. 3: (1) an amplifier transistor 181; (2) a silicon control rectifier 182 which is fired in response to an amplified address tone; (3) an "on-off" switching transistor 183 which is controlled by the rectifier 182 in such a manner as to connect lines 197 and 14 (FIG. 3) to line 195 in response to such address tone; (4) a clock which comprises the transistors 184 and 185, and associated circuitry so constructed and arranged as to perform two functions: the clearing action mentioned above and the opening of rectifier 182 and opening of switch 183 at a suitable time following the processing of the tone sequence.

Referring to FIG. 3 and assuming no output from the address filter 11, amplifier transistor 181, silicon control rectifier (SCR) 182, and the transistors 183, 184, and 185 are all non-conducting. Neither of capacitors 186 nor 187 has accumulated any charge. When a signal of sufficient amplitude and correct polarity is applied to transistor 181, then SCR 182 is fired, providing a ground return via base resistor 196, so that transistor 183 becomes conductive, providing positive supply voltage to the decoder circuits. It will be observed that the transistor relay 183, when it becomes conductive, simultaneously admits power to the decoder, via line 14, and also to the clock comprising transistors 184 and 185 (via line 197). Transistors 184 and 185 function as a hysteresis clock and comprise a free-running complementary multivibrator pair.

As long as the address tone is present, transistor 185 is held on by feedback to transistor 181 through diode 188 and resistor 189, and capacitor 187 is charged to the polarity shown through the base of transistor 184.

This action momentarily turns transistor 184 on, dropping the clearing line 173 to near ground potential. This latter action clears all memory switches, since the feedback which holds these switches in the "set" condition cannot be maintained if the points 210, 211, etc., are momentarily grounded by transistor 184 through diodes 171, 172, etc. When capacitor 187 has charged, transistor 184 opens and the clearing line 173 returns to high potential. At this time capacitor 186 charges rapidly to the polarity shown. All of this takes place within the first few milliseconds after application of the address tone.

Now, as long as the address tone is present, the circuit will remain in the state described. When the address tone is removed, transistor 181 opens. This in turn opens transistor 185, and the positive end of capacitor 187 finds itself at ground potential.

This action is as follows: Remove the input signal, and the base current supplied for biasing transistor 184 must feed through the high valued resistance 190. This drops the base of transistor 184 and allows the collector to approach the load potential. This moves the base of transistor 185 toward its emitter and reduces its conduction. That results in a fall of potential at the collector of transistor 185, and, since that potential change is reflected directly into the base of transistor 184, the base of transistor 184 is further deflected toward cut-off. This action in the clock circuit is regenerative and results in essentially instantaneous cut-off of transistors 184 and 185. Such action allows the collector of transistor 185 to fall to ground potential, while capacitor 186 rapidly charges to essentially the supply voltage and the polarity indicated. Capacitor 187 and resistor 190 comprise the timing circuit which provides the slow release.

Capacitor 187 at the same time begins slowly discharging through the resistor 190. Capacitor 187 would eventually charge to approximately the supply voltage of a polarity opposite to that shown in FIG. 3, were the process to continue uninterrupted. But, after the potential on capacitor 187 reverses and overcomes the barrier voltage in the branch comprising diode 191 and the base-emitter junction of 184, current flowing through 190 becomes momentarily effective to trigger transistor 184 and transistor 185. This results in a potential rise corresponding to the degree of excitation at the collector of 185. That change of voltage at said collector is regeneratively coupled to transistor 184 through capacitor 187 and diode 191, with the result that transistors 184 and 185 are again driven into hard saturation. The collector of transistor 184 therefore drops to ground potential, and, since capacitor 186 had been previously charged to supply voltage in the polarity shown, the anode of silicon-controlled rectifier 182 now goes rapidly negative. This cuts off the silicon-controlled rectifier 182, which in turn opens the switch 183. This circuit has a very stable timing period, since it depends only upon the time constant of resistor 190 and capacitor 187, which can be relatively independent of temperature. The circuit has a further advantage in that the timing period is unaffected by changes in the magnitude of the supply voltage.

Capacitor 209 is an integrating capacitor to prevent impulse type voltage from energizing the address switch. Resistor 200 and capacitor 201 are standard gate protection for the SCR 182. The resistor 200 reduces leakage, while the capacitor 201 removes noise from the gate.

Resistor 202 is the collector resistor for transistor 181. This resistor allows transistor 181 to amplify the input signal current.

Resistor 203 provides standard base protection for transistor 183. It is used to reduce leakage. Diode 204 is used to block a "sneak current" path during stand-by which would otherwise allow a small stand-by current to flow. This "sneak path" is through resistor 196, diode 212, and resistor 193.

Diode 212 is used to prevent capacitor 186 from building up reverse voltage due to leakage. Resistor 205 provides base protection for transistor 184.

Resistor 206 is a thermistor used to temperature-compensate transistor 184, so that the action described will prevail over a wide temperature and voltage range.

Referring again to FIG. 2, the output lines may be utilized in any one of several ways. The momentary output switch shown at the bottom of FIG. 1 corresponds to the switches 154 and 157 illustrated in FIG. 3. In the alternative, any pair of output lines may be utilized to control a silicon control rectifier which requires two commands, one to turn it on and the other to turn it off. The turn-on process is identical to that described for switches 152, 154, and 157. Such a rectifier may be turned off by utilizing a momentary output switch on the other output line of the pair to shunt it out, for example. Also, as indicated at the bottom of FIG. 1, any one of the output lines may be connected to a relay type of output.

Given the teachings of FIG. 3, it is quite easy to construct a device including further filters for tones A, B, C, and D and having twenty-one output switches—that is, eighteen switches in addition to the three shown in FIG. 3. The primaries of the filter networks are simply connected in series with the primaries 101 and 111. The low potential terminal of each filter is connected to line 145 in the manner shown. Each filter feeds into a command memory switch. Each command memory switch is appropriately coupled to the power line 14 and the clearing line 173. The output of each memory switch is connected to the cathodes of six diodes. The top group of diodes is designated B, C, D, E, F, G (FIG. 2). The significance of the "B" is that the anode of the diode 58 is connected to the anode of a diode 64 marked "A" in the output of the B tone command switch. The diode 59 is marked "C," the significance of this being that the anode of this diode is connected to the anode of a diode 70 marked "A" in the output of the memory command switch for tone C. As will be seen from examination of FIG. 2, the end result is twenty-one lines and forty-two diodes, making twenty-one "and" circuits, as shown.

While there has been shown and described what is at present considered to be the preferred embodiment of the invention, it will be obvious to those skilled in the art that various modifications and changes may be made therein without departing from the scope of the invention as defined by the appended claims.

I claim:

1. In a device for performing switching functions in response to discrete modulations in a plurality of channels contained in an electromagnetic wave signal spectrum over which wave noise extends, the combination of:

a plurality of switching means, each adapted to be biased with one polarity to be actuated and with opposite polarity to be biased off;

a plurality of discrete filter-detectors, each comprising a distinctly tuned filter and a detector in cascade with the filter, and having an output coupled to an individual one of the switching means, for selecting the components of said modulations and utilizing the components to produce bias potentials of said one polarity;

an aperiodic detector means responsive to noise distributed at random within said spectrum for producing a bias potential of said opposite polarity; and means for differentially combining the output of the aperiodic detector means with the outputs of each of the cascaded detectors;

the impedance of each tuned filter to noise being lower than its resonant impedance and small compared to the impedance of the aperiodic detector means, whereby the bias potentials of the filter-detectors due to noise are small compared to that of the aperiodic detector means, so that the aperiodic detector means biases off all of the switching means except those to which the filter-detectors selecting modulation components are coupled.

2. The combination in accordance with claim 1 and a constant current source for supplying the discrete modulations in the form of a sequence of command tones.

3. The combination in accordance with claim 2 in which each of the switching means is a memory device.

4. The combination in accordance with claim 3, and a matrix comprising "and" circuits having inputs coupled to each pair of memory devices, each "and" circuit having an output, the total number of "and" circuit outputs equaling the number of tone sequence combinations which can be made from the whole number of tones, taken in an arbitrarily selected number at a time.

5. In a decoding device of the type adapted to respond to electromagnetic wave signals, comprising command tones of distinct frequencies contained in a spectrum over which noise extends, and to perform switching functions in compliance with said command tones, the combination of:

a plurality of electronic switching devices of the type actuated by a bias of one polarity and biased off by a bias of opposite polarity;

a plurality of discrete band-pass filter-detector means, each tuned to select a related one of said tones and having an output individually coupled to an individual one of said switching means and individually poled to actuate its associated switching means on reception of said related tone;

a single aperiodic detector means responsive to white noise and having an output oppositely poled to all of the outputs of the filter-detector means;

and means for differentially combining the output of the aperiodic detector means with each of the outputs of the filter-detector means, whereby noise is detected by the aperiodic detector means to bias off all of the switching devices except those to which filter-detector means selecting tones are coupled.

6. In a decoding device of the type adapted to respond to electromagnetic wave signals, comprising address and command tones of distinct frequencies contained in a spectrum over which noise extends, and to perform switching fuctions in compliance with said command tones, the combination of:

means for supplying the address tone and the command tones in a sequence;

a plurality of electronic memory devices of the type actuated by a bias of one polarity and biased off by a bias of opposite polarity, said plurality being equal to the number of command tones;

a plurality of discrete band-pass filter-detector means, each tuned to select a related one of said tones and all except that one filter-detector means which is tuned to the address tone having an output individually coupled to an individual one of said memory devices and individually poled to actuate its associated memory device on reception of said related tone;

switching means coupled to that one filter-detector means for responding to an address tone to enable the memory devices;

a single aperiodic detector means responsive to noise and having an output; and means for differentially combining the output of the aperiodic detector means with each of the outputs of the filter-detector means, whereby noise is detected by the aperiodic detector means to bias off the switching device and all of the memory devices except those to which filter-detector means selecting tones are coupled.

7. In a device for processing wave signals, the combination of:

a plurality of narrow band filters, each including
- a detector having a diode and
- a resistance-capacitance load network and
- a pair of terminals,
- all of the diodes being poled alike and
- one terminal of each pair being connected to a common point and
- the other terminal of each pair being an output terminal, whereby there are as many output terminals as there are narrow band filters;

an aperiodic detector having
- a resistance-capacitance network and
- a diode, and
- a pair of terminals,
- the last-mentioned diode being oppositely poled, one of the two terminals associated with the aperiodic detector being connected to a point of reference potential and the other terminal providing said common point, whereby currents in the last-mentioned resistance-capacitance network bias in a reverse direction the diodes associated with the narrow band filters to prevent signals from appearing at any of the output terminals, except the terminals associated with resistance-capacitance load networks producing signal intelligence.

8. The combination of:

a high-impedance source of signals including discrete tones;

a plurality of distinct frequency-dependent networks coupled to said source, and including active electronic elements for sensing the presence of discrete tones;

a frequency-independent network coupled to said source for sensing the magnitude of white noise;

and means for coupling the output of said frequency-independent network to said active electronic elements to bias back the active electronic elements of the frequency-dependent networks;

whereby the greater the noise, the greater the back bias on the active electronic elements of said frequency-dependent networks, the networks being so proportioned that said back bias disables all active electronic elements except those in the frequency dependent networks which are receiving tones.

9. The combination in accordance with claim 8 in which each frequency-dependent network comprises a tuned circuit and a peak detector into which the tuned circuit works;

and in which the frequency-independent network comprises a resistive impedance and a peak detector into which said resistive impedance works.

References Cited

UNITED STATES PATENTS

| | | | |
|---|---|---|---|
| 2,852,622 | 9/1958 | Fedde et al. | 325—478 |
| 3,060,408 | 10/1962 | Stewart | 340—171 |
| 3,199,031 | 8/1965 | Harris et al. | 325—478 |
| 3,213,372 | 10/1965 | Kurvits | 325—478 |
| 3,238,503 | 3/1966 | Uitermark et al. | 340—171 |
| 3,250,999 | 3/1966 | Cole | 325—478 |
| 3,288,940 | 11/1966 | Bennett et al. | 340—171 |

THOMAS B. HABECKER, *Acting Primary Examiner.*

NEIL C. READ, *Examiner.*

H. I. PITTS, *Assistant Examiner.*